United States Patent [19]

Okubo et al.

[11] Patent Number: 5,254,402
[45] Date of Patent: Oct. 19, 1993

[54] MOLDING LAMINATE

[75] Inventors: Syunji Okubo, Ohtsu; Toshiharu Nakae, Shiga; Osamu Wada, Nagoya; Masayuki Togo, Kyoto; Fusayoshi Akimaru, Ohtsu, all of Japan

[73] Assignee: Toray Industries, Inc., Tokyo, Japan

[21] Appl. No.: 799,212

[22] Filed: Nov. 27, 1991

[30] Foreign Application Priority Data

Nov. 30, 1990 [JP] Japan ................................ 2-339742
Dec. 26, 1990 [JP] Japan ................................ 2-406901
Sep. 26, 1991 [JP] Japan ................................ 3-247649
Sep. 26, 1991 [JP] Japan ................................ 3-247650

[51] Int. Cl.$^5$ ................................................ B32B 7/12
[52] U.S. Cl. ................................ 428/317.7; 428/319.7; 428/318.4
[58] Field of Search ............... 428/317.1, 317.7, 318.4, 428/319.7

[56] References Cited

U.S. PATENT DOCUMENTS

| 4,259,408 | 3/1981 | Moschter | 428/424.6 |
| 4,282,697 | 8/1981 | Spielau et al. | 52/746 |
| 4,301,053 | 11/1981 | Wolfrey | 524/104 |
| 4,762,880 | 8/1988 | Leung | 524/853 |
| 4,906,516 | 3/1990 | Okamura et al. | 428/215 |
| 5,089,364 | 2/1992 | Lee et al. | 430/58 |
| 5,091,239 | 2/1992 | Przeworski et al. | 428/195 |

FOREIGN PATENT DOCUMENTS 0028715 11/1970 European Pat. Off. .
2024101 1/1980 United Kingdom .

OTHER PUBLICATIONS

Patent Abstracts of Japan, vol. 15, No. 13, Jan. 11, 1991 & JP-A-2 265 737.

*Primary Examiner*—George F. Lesmes
*Assistant Examiner*—Chris Raimund
*Attorney, Agent, or Firm*—Nikaido, Marmelstein, Murray & Oram

[57] ABSTRACT

A molding laminate includes a cross-linked polyolefin resin foam, a facing material laminated on the foam, and an adhesive layer adhering the foam and the facing material to each other. The adhesive layer comprises a water-based adhesive material cured by a curing agent, and is baked in advance of the interlaminal adhesion process onto the cross-linked polyolefin resin foam and/or the facing material.

44 Claims, 2 Drawing Sheets

MOLDING LAMINATE

BACKGROUND OF THE INVENTION

The present invention relates generally to molding laminates, and particularly to a molding laminate comprising a resin foam and a facing material laminated thereon.

Automobile interior materials such as door trim, panels, or ceilings, etc. are composed of a molded laminate incorporating a resin foam pad, and a facing material laminated thereon. Such laminate can be molded into desired form by, for example, a vacuum-molding method or a stamp-molding method.

The pad and the facing material of such laminates are adhered together by an adhesive material which generally is an organic-solvent based adhesive material containing an isocyanate cross-linking agent (as disclosed for example in Japanese Patent Publication Nos. 55067/1982 and 228/1988). This type of adhesive material, however, creates environmental hazards due to the volatile solvent contained therein, and safety devices such as explosion-proof equipment would be required in a plant for manufacturing interior detail materials using such adhesives. Therefore, the practice of using water-based adhesives in place of organic-solvent based adhesives in laminates has begun. Japanese Patent Publication No. 33518/1988, for example, teaches a water-based adhesive material containing an aziridine compound as a cross-linking agent.

However, the adhesive strength therein between the pad and the facing material tends to be insufficient, such that the facing material can easily peel away from the pad, particularly when the laminate is molded into complex forms by a deep-draw molding method, or is exposed to an atmosphere of high temperatures.

SUMMARY OF THE INVENTION

An object of the present invention is to improve the adhesive strength of a molding laminate manufactured with a water-based adhesive material.

Another object of the present invention is to provide a method of manufacturing a molding laminate having improved adhesive strength.

Still another object is to improve adhesive retention in a stamp-molded article of a laminate composed of a resin foam and a facing material adhered to each other by a water-based adhesive material.

Still another object of the present invention is to provide a method of manufacturing the above-described stamp-molded article.

A molding laminate according to one aspect of the present invention includes a cross-linked polyolefin resin foam, a facing material laminated thereon, and an adhesive layer which adheres the facing material to the cross-linked polyolefin resin foam. The adhesive layer comprises a water-based adhesive material having been cured by a curing agent and baked prior to the inter laminate adhesion process onto the cross-linked polyolefin resin foam and/or the facing material.

A method of manufacturing a molding laminate according to another aspect of the invention includes the steps of: preparing a cross-linked polyolefin resin foam and a facing material; applying a water-based adhesive material containing a curing agent to the cross-linked polyolefin resin foam and/or the facing material; drying the adhesive material; baking on the adhesive material thereby to form an adhesive layer; laminating the facing material on the cross-linked polyolefin resin foam with the adhesive layer therebetween; and adhering the facing material to the resin foam by heat and pressure.

A stamp-molded article according to still another aspect of the invention includes a cross-linked polyolefin resin foam, a rigid layer thermally fused onto the foam, a facing material laminated on the foam, and an adhesive layer composed of a water-based adhesive material containing a curing agent for adhering the facing material to the foam. Prior to lamination, the adhesive layer is baked on the cross-linked polyolefin resin foam and/or the facing material.

Another method according to the invention in an additional aspect utilizes a molding device having upper and lower mold-halves whereby the above-described stamp-molded article is fashioned. This manufacturing method includes the steps of: supplying a thermoplastic resin parison into the lower mold-half; placing, on the resin parison, a molding laminate comprising a cross-linked polyolefin resin foam and a facing material laminated on the foam through an adhesive layer which is composed of a water-based adhesive material containing a curing agent baked prior to the inter-laminate adhesion process onto the foam and/or the facing material, such that the facing material of the laminate is opposite the upper mold-half; and closing the molds tightly, thereby defining the laminate and the thermoplastic resin as a single body.

The foregoing and other objects and advantages of the present invention will be more fully apparent from the following detailed description.

DESCRIPTION OF THE INVENTION

General Structure of a Molding Laminate

Figure 1:
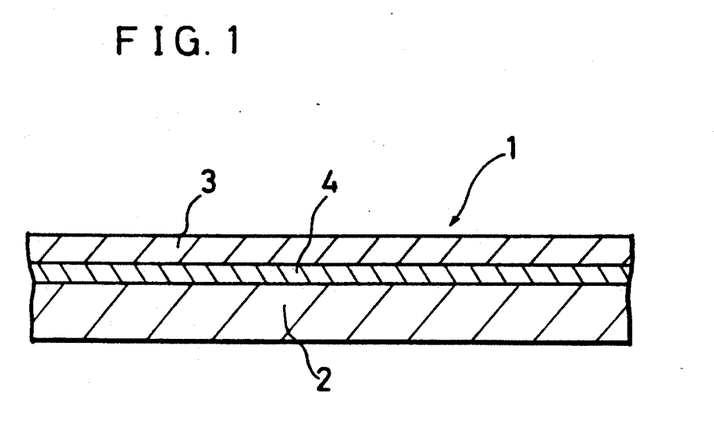
FIG. 1 is partly in a sectional view of a laminate according to an embodiment of the invention.

The general structure of a laminate in accordance with one embodiment of the invention is illustrated by FIG. 1. The laminate 1 comprises a laminar resin foam 2, a facing material 3 laminated on the resin foam 2, and an adhesive layer 4 adhering the facing material 3 to the resin foam 2. The adhesive layer 4 is baked onto the resin foam 2 and/or the facing material 3.

Figure 2:
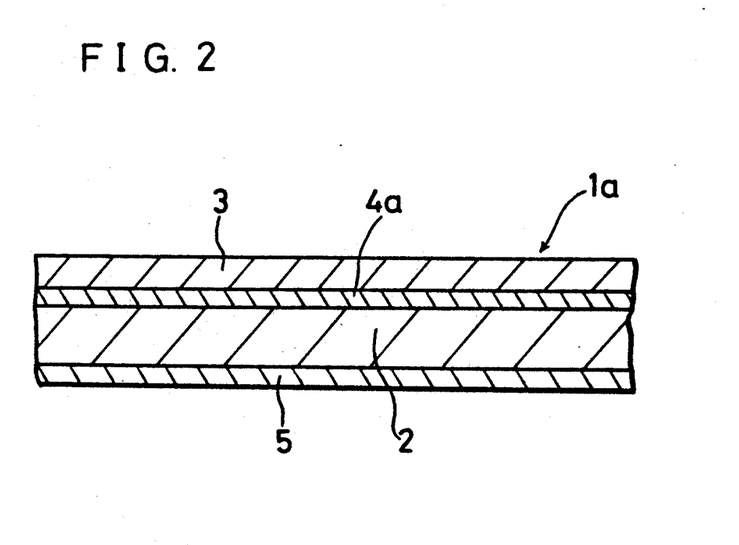
FIG. 2 is partly in a sectional view of a laminate according to another embodiment of the invention.

Referring now to FIG. 2, the structure of a molding laminate 1a as shown according to another embodiment of the invention comprises the resin foam 2, the facing material 3, and a first adhesive layer 4a adhering the facing material 3 to the resin foam 2, likewise as above. In addition, the laminate 1a includes a second adhesive layer 5 formed on the reverse surface of the resin foam 2.

In the case of this laminate 1a, the first adhesive layer 4 is baked onto the obverse surface of the resin foam 2 and/or the facing material 3, and the second adhesive layer 5 is baked onto the reverse surface of the resin foam 2.

Resin Foam

The resin foam employed in the laminate of this invention is a cross-linked polyolefin resin foam which can be, for example, an olefin polymer such as polyethylene resin or polypropylene resin. The polyethylene resin can be an ethylene homopolymer resin, or a polyethylene resin copolymerized with a substance other than ethylene, e.g., olefin vinylacetate, acrylic acid, or acrylic ester. The ethylene homopolymer resin preferably should have a density within the range of 0.897 to 0.955 g/cm$^3$, and a melt index within the range of 0.5 to 55. Suitable polypropylene resins include propylene homopolymers, or copolymeric resins of propylene and ethylene, butene or a diene monomer.

The most preferable polyolefin resin is a copolymer resin containing 0.5 to 35 mole percent ethylene or butene. The polypropylene resin may be a random copolymer, a block copolymer, or a random block copolymer.

The aforementioned polyolefin resins may be used singly or in combination.

The cross-linking of the polyolefin resin may be by subjection to such radiation as electron rays, alpha, beta, or gamma particles; or by a chemical process employing a peroxide such as dicumyl peroxide; or by exposure to ultraviolet light. This foam may have a gel percent in the range of 5% to 75%, more preferably from 30% to 55%, and an apparent density of 0.5 to 0.020 g/cm$^3$ more preferably from 0.10 to 0.033 g/cm$^3$.

If the laminate is to be molded by a stamp-molding method, the cross-linked polyolefin resin foam may have an average gel percent in the range of 30% to 75%, more preferably from 40% to 65%, and an apparent density of 0.5 to 0.020 g/cm$^3$, more preferably from 0.100 to 0.040 g/cm$^3$. If average gel percent herein is less than 30%, the foam may be subject to breakage due to the temperature of the rigid resin material, and to the molding pressure employed in the stamp-molding process, resulting in unevenness in the surface of the stamp-molded article. On the other hand, if the average gel percent is in excess of 75%, the elongation percentage of the foam is decreased such that the foam is likely break during the molding process, making it difficult to achieve a stamp-molded article of desired form. Furthermore if the apparent density is greater than 0.5 g/cm$^3$, the textural qualities of the foam are degraded, making it unsatisfactory for use as a padding material. Conversely, if the apparent density is under 0.02 g/cm$^3$, the rigidity of the foam is decreased such that it is easily subject to breakage during the molding process.

The term gel percent in the above is a value which signifies the percentage by weight of insoluble substance in proportion to the initial weight of a specimen (0.1 g) of a foam after soaking the specimen in tetralin at 130° C. for three hours. The apparent densities cited above are values in accordance with Japan Industrial Standard-K6767.

The laminal thickness of the cross-linked polyolefin resin foam usually is in the range of 1.0 to 10.0 mm. The thickness may be suitably chosen according to the purposes for which the laminate will be used. If the laminate is to be molded by a stamp-molding method, the foam should preferably be 0.5 to 10 mm in thickness.

Facing Material

The laminate facing material coats the surface of the resin foam. Suitable facing materials include natural or synthetic fiber webbing, synthetic resin composed principally of polyvinyl chloride resin, thermoplastic elastomer, or leather, the choice of which depends on how the laminate to be employed. The thickness of the facing material normally should be on the order of 0.2 to 2.0 mm.

When the laminate is to be stamp-molded, the facing material can have a 100%-elongation stress at 25° C. of less than 150 kg/cm$^2$, preferably within the range of 25 kg/cm$^2$ to 120 kg/cm$^2$. If the stress rating is greater than 150 kg/cm$^2$, the facing material is subject to breakage during the molding process, as is the surface of the foam opposite the facing material. The 100%-elongation stress is rated according to JIS-K6767.

Adhesive Layer

The adhesive layer consists of a water-based adhesive material containing a curing agent. The adhesive material may be, for example, an emulsion of acrylic resin or urethane resin containing polar elements.

The polar elements are polar functional groups having a general structure which can be represented as follows:

Examples of suitable acrylic resin include acrylic copolymer of 2-ethylhexylacrylate, methyl methacrylate, acrylic acid, styrene, 2-hydroxyethyl methacrylate, butylacrylate, ethylacrylate, acrylamide, or the like. Such acrylic resins can be obtained by emulsion polymerization.

A urethane resin herein can comprise polyisocyanate and a compound having polar groups such as polyester, polyether or polyetherester. The polyester can be, for example, a condensation product obtained from a saturated or unsaturated polybasic carboxylic acid such as adipic acid, succinic acid, maleic anhydride or sebacic acid, or an acid anhydride thereof, and polyhydric saturated alcohols, polyalkyleneglycols, or mixtures thereof. The polyhydric saturated alcohols can be ethyleneglycol, propyleneglycol, tetramethyleneglycol, trimethylolpropane, 1,6-hexanediol, and 1,4-butanediol. The polyalkyleneglycols can be polyethylene glycol, polypropylene glycol, and polytetramethylene glycol of relatively low molecular weight. The polyether can be an alkylene oxide such as ethylene oxide or propylene oxide, a polymerized product such as styrene oxide or epichlorohydrine, and a random or block copolymer thereof, or an additional polymer of such materials compounded with polyhydric alcohols. The polyetherester can be, for example, a product obtained by adding an epoxy compound such as ethylene oxide or propyleneoxide to the aforementioned polyester.

The polyisocyanate can be an aromatic diisocyanate such as tolylenediisocyanate and an isomer thereof or 4,4-diphenylmethane diisocyanate, an aromatic aliphatic diisocyanate such as xylylene diisocyanate, an aliphatic diisocyanate such as hexamethylenediisocyanate or 2,2,4-trimethylhexamethylene diisocyanate, and other polyisocyanates obtained by adding trimethylol propane or its equivalent to the aforementioned diisocyanates. Such polyisocyanates may be used singly or in combination.

Other urethane resins may be used, for example, as disclosed in Japanese Patent Publication No. 224192/1967 or 38760/1978, or Japanese Laying-Open No. 126795/1975. A suitable urethane resin can be emulsified by dispersing the urethane resin in water using an emulsifying agent.

A water-based urethane resin having molecular ends comprising hydroxyl or carboxyl groups may be substituted for the urethane resin emulsion. Other water-based urethane resins may be used in which the composition of source materials is adjusted to yield molecular ends having isocyanate groups blocked by such salts as bisulfite bases.

The above-described acrylic adhesive materials or urethane adhesive materials may be used singly, or in mixed form, in which case the drying and adhering properties can be adjusted to suit requirements.

Suitable water-soluble curing agents incorporated into the water-based adhesive material include epoxy or aziridine curing agents.

The epoxy curing agents can be water-soluble epoxy compounds or a water-dispersion epoxy compounds. Such epoxy compounds include compounds having two or more glycidyl groups of acrylic polymers copolymerized with sorbitol polyglycidylether, polyglycerol polyglycidylether, pentaerythritol polyglycidylether, diglycerol polyglycidylether, triglycidyl-tris(2-hydroxyethyl) isocyanurate, glycerolpolyglycidylether, trimethylolpropanepolyglycidylether, neopentylglycolglycidylether, 1,6-hexanedioldiglycidylether, polyethyleneglycoldiglycidylether, 1,8-bis(N,N-diglycidylaminoethyl)cyclohexane, N,N,N',N"'-tetraglycidyl-m-xylenediamine, or glycidylmethacrylate. The insoluble materials among these compounds can be used if they are dispersed in water using an emulsifying agent.

The epoxy curing agent which reacts with the afore-described acrylic or urethane resins forms cross-linking structures of the types indicated below. (In the following configurations, "Poly" represents a polymer chain.)

① Resin containing hydroxyl groups:

Poly—OH + CH₂——CH—R—CH——CH₂ +
         \\ /        \\ /
          O            O HO—Poly ---->

Poly—O—CH₂—CH—R—CH—CH₂—O—Poly
              |        |
              OH       OH ② Resin containing carboxyl groups:

Poly—COOH + CH₂——CH—R—CH——CH₂ +
           \\ /        \\ /
            O            O HOOC—Poly ---->

Poly—COOCH₂—CH—R—CH—CH₂OOC—Poly
             |        |
             OH       OH ③ Resin containing amino groups:

Poly—NH₂ + CH₂——CH—R—CH——CH₂ +
          \\ /        \\ /
           O            O

H₂N—Poly ---->

-continued

Poly—NH—CH₂—CH—R—CH—CH₂—H₂N—Poly
             |        |
             OH       OH Water-dispersion aziridine compounds may be used as the aziridine curing agent. Such aziridine compounds can have two or more aziridine rings, for example
(a)  4,4'-bis(ethyleniminocarbonylamino)diphenylmethane, or
(b) 2,2'-bishydroxymethyl-butanol-tris[3-(1-aziridinyl)-propionate].

Two or more of this class of aziridine compounds may be used in combination. Aziridine compounds (a) and (b) above are represented by the following general structural formulas:

Aziridine compounds are generally insoluble in water, and therefore prior to use they are forcedly dispersed in water, using a small quantity of an emulsifying agent, after having been temporarily dissolved in a solution of dimethylsulfoxide or dimethylformamide.

The aziridine curing agent which reacts with the above-described acrylic resin or urethane resin can form cross-linking structures such as those indicated below. (In the following configurations "Poly" represents a polymer chain.)

① Resin having hydroxyl groups:

Poly—O—CH₂—CH₂—NH—R—NH—CH₂—CH₂—O—Poly

② Resin having carboxyl groups:

Poly—COO—CH₂—CH₂—NH—R—NH—CH₂—CH₂—OOC—Poly

③ Resin having amino groups:

Poly—NH—CH₂—CH₂—NH—R—NH—CH₂—CH₂—NH—Poly

The mixing ratio (A:B) of the water-based adhesive agent (A) and the curing agent (B) expressed in as percent solid should be within the range from 100:1 to 100:20, and preferably within the range from 100:5 to 100:15. In an instance of molding by the stamp-molding method, the preferred range is from 100:8 to 100:15.

Molding Laminate Manufacturing Method

The cross-linked polyolefin resin foam and the facing material are prepared initially. Then, a water-based adhesive containing a curing agent is applied to the adherence surface of the foam and/or the facing material using a wire coater, a doctor knife, a roll coater, a reverse coater or the like. Normal coverage during application is from 5 to 200 g/m². The viscosity of the water-based adhesive is preferably adjusted to be within 8000 to 12000 cps using thickener such as polycarboxylic acid polymer or carboxymethyl cellulose in order to optimize efficiency in the work of application.

The applied water-based adhesive material is dried and then is baked onto the adherence surfaces, forming an adhesive layer on the foam and/or the facing material. Sufficient adhesive strength between the foam and the facing material is not be achieved if the adhesive material is not baked on or is dried only by using a hot air fan or the like. The baking process is preferably carried out using an infrared heater, in which case the average wavelength of the irradiating rays should be within the range of 0.75 to 1000 μm, more preferably in the range of 2 to 14 μm.

When a water-based adhesive material containing a epoxy curing agent is applied to the foam, the baking temperature is preferably set such that the surface temperature therein reaches 70° to 150° C. If the surface temperature does not reach 70° C., insufficient adhesive strength results. Conversely, if the surface temperature goes higher than 150° C., the surface of the foam tends to become rough, deteriorating the quality of the manufactured product. When a water-based adhesive material containing an aziridine curing agent is applied to the foam, the surface temperature during the baking process should be within the range of 60° C. to the melting point of the resin component of the foam, preferably within the range of 90° to 140° C. If the surface temperature during baking goes outside this range, undesirable effects similar to those which can arise in the case in which an epoxy curing agent is used can occur.

The foam and the facing material are then placed together in contact through the adhesive layer. When this sandwich of materials is heated at 50° to 100° C. and compressed, a laminate as shown in FIG. 1 is obtained.

If an adhesive layer is formed onto the reverse surface of the foam as well, a laminate as shown in FIG. 2 is obtained. This adhesive layer can be formed according to the method described above, in which a predetermined quantity of a water-based adhesive material applied to the foam is dried and baked under infrared-ray radiation.

In a specific mode of laminate manufacturing according to the present invention, a soft sheet of polyvinyl chloride resin 0.7 mm in thickness is employed as the facing material, and a foamed polyolefin resin 3 mm in thickness having a gel percent of 40% and an apparent density of 0.050 g/cm³ is employed as the foam material. A water-based adhesive material is prepared by adding a water-dispersion aziridine curing agent of 10 parts by weight to an active hydrogenate emulsion of 100 parts by weight. It is then applied to at least one of the interfacial surfaces of the foam and the facing material at a spread rate of 50 g/m².

Next, the water in the adhesive material is evaporated at 90° to 150° C., and the adhesive material is baked using an infrared heater. Subsequently, the facing material and the foam are heated to 50° to 100° C. and compressed, whereby the facing material and the foam are adhered.

Additionally, an adhesive material is applied to the reverse surface of the foam, and the water therein is evaporated, after which the adhesive material is baked onto the foam.

Utilization of a Molding Laminate

A laminate according to the present invention can be molded into such desired forms as instrument panels, door trim or ceilings of automobile interiors using, for example, a vacuum-molding method or a compression-molding method. Automobile interior articles fashioned of a molded laminate as shown in FIG. 2 are easily fitted into designated regions of doors, ceilings and the like by virtue of the adhesive layer formed on the foam.

Stamping Molded Product

Figure 3:
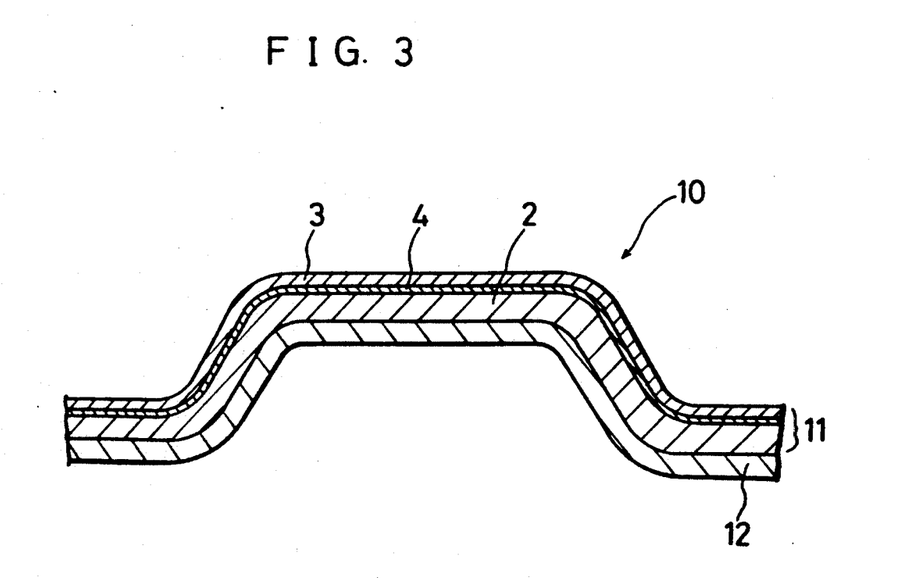
FIG. 3 is partly in a sectional view of a laminate according to still another embodiment of the invention.

A laminate manufactured according to this invention can be molded into desired form using a stamp-molding method. such a stamp-molded article is illustrated in partial cross section in FIG. 3. The stamp-molded article 10 principally comprises a laminate 11, and a rigid layer 12 reinforcing the molded foam of the laminate 11.

The laminate 11 is formed as described in the above, wherein it is composed principally of a resin foam sheet 2, a facing material 3 laminated onto the resin foam 2, and an adhesive layer 4 adhering the facing material 3 to the resin foam 2. The rigid layer 12 is formed of a thermoplastic resin which is thermally fused to the resin foam 2 of the laminate 11.

Rigid Layer

Examples of thermoplastic resins which can comprise the rigid layer include alpha olefin polymer resins such as polyethylene resin, copolymer resins of ethylene and alpha olefin (e.g., straight-chain polyethylene resins of low density, intermediate density or high density comprising copolymers of ethylene and alpha olefin); or polyethylene resins copolymerized with a monomer such as vinylacetate, acrylic acid, or acrylic ester. These thermoplastic resins may be utilized singly or in combination. Those particularly preferable are resins containing ethylene, propylene or butene homopolymers, as well as resins containing random, block, or random-block copolymers of these homopolymers.

Extenders, thickeners, dyes, antioxidants, stabilizers or the like may be added to the thermoplastic resin.

Manufacturing Method Stamp-Molded Article

An illustrative method of fashioning a stamp-molded article as in the above is as follows.

First, a block or sheet parison of the thermoplastic resin constituting the rigid layer is set into the lower mold-half of a molding device. The temperature of the thermoplastic resin therein is normally about 180° to 220° C., depending on the resin substance.

A laminate as described above is set onto the thermoplastic resin in the lower mold such that the facing material of the laminate is opposite the upper mold-half. The laminate is normally utilized at room temperature; however, the laminate may be heated.

The mold halves of the molding device are closed by pressing the upper mold against the lower mold, molding the laminate into a predetermined form. At the same time, the thermoplastic resin parison is fused to the resin foam of the laminate, whereby the thermoplastic resin forming the rigid layer and the laminate are integrally adhered to each other to thus fashion the stamp-molded article. The mold closure pressure is normally about 30 to 120 kg/cm$^2$.

The stamp-molded article can be utilized, for example, in the interior of automobiles as door trim, ceiling, and floor material. The adhesive strength between the resin foam 2 and the facing material 3 of a stamp-molded article formed of the above-described laminate, is high. The resin foam 2 and the facing material 3 thus remain stably adhered to each other even if the stamp-molded article is fashioned into a complicated form by a deep-draw molding method. Due to the fact that the average gel percent of the resin foam and the elongation stress of the facing material are within the previously mentioned ranges, wrinkles or milkiness in the facing material are averted, and the laminate is of excellent appearance.

According to the foregoing method, the thermoplastic resin is set into the lower mold-half of the molding device, but it may be set into the upper mold-half as well. The molding device may be of any form having at least a pair of mold sections. For example, a pair of molds operating laterally may be used.

The method of manufacturing a stamp-molded article will now be described in greater detail.

A soft polyvinyl chloride sheet (0.45 mm in thickness) with a 100%-elongation stress of 135 kg/cm$^2$ is used as the facing material, and a polyolefin resin foam, comprising 82 parts by weight polypropylene resin, including 5% random copolymer of ethylene, and a straight-chain polyethylene resin of 18 parts by weight having a density of 0.918 g/cm$^3$ and a melt index of 8, is used as the foam. A water-based adhesive material comprising an emulsion of 100 parts by weight containing active hydrogen and a water-dispersion aziridine curing agent (Chemitite DZ-22) of 10 parts by weight added thereto is prepared, and is applied to at least one of the interlaminal surfaces of the foam and the facing material at a spread rate of 50 g/m$^2$ (wet).

The adhesive material is then dried, and is baked using an infrared heater (of the Inconel type). The surface temperature thereof of the adhesive material during baking reaches 100° to 120° C. Next, the heated facing material is laminated onto the foam, and the laminate is heated to 50° to 100° C. and compressed in order to adhere the laminate. The thermoplastic resin constituting the rigid layer is set on the surface of the foam of the laminate thus obtained, and, employing the stamp-molding method, the final article is manufactured.

DESCRIPTION OF THE PREFERRED EMBODIMENTS

The following examples are illustrative embodiments of the method of the invention. All parts and percentages are by weight unless otherwise indicated.

EXAMPLES 1 to 3

A water-based adhesive material was procured by mixing an urethane resin emulsion (Toray Inc. BW-210) of 50 parts containing hydroxyl groups and carboxyl groups in 45% solid and having an average molecular weight of 200,000, an acrylic resin emulsion (Toray Inc. BW-210-1) of 50 parts containing hydroxyl groups and carboxyl groups in 45% solid and having an average molecular weight of 700,000, and a glycerolpolyglycidyl ether (Nagase Chemical Co. Denacaol Ex-313) of 10 parts. A thickener (Kao Co. Bissurf F) was added to the water-based adhesive material so as to yield a viscosity of 9500 cps.

The water-based adhesive material thus procured was applied at a spread rate of 50 g/m$^2$ to the principal surface of a propylene resin foam sheet of the apparent density shown in Table 1, using a gravure roll method. The applied water-based adhesive material was dried, and then was baked using a 7-μm ray infrared heater. The surface temperature of the foam during the baking process was kept at 80° C.

Next, a sheet of blended resin, comprising polyvinyl chloride resin and ABS resin (acrylonitrile-butadiene-styrene resin), 0.7 mm in thickness, was laminated on the foam adhesive layer and pressed against it under 100° C. heat, to produce a molding laminate.

COMPARATIVE EXAMPLE 1

In place of the water-based adhesive material, an adhesive material procured by mixing an isocyanate curing agent of 10 parts into a general polyester adhesive solvent of 100 parts was used, with which a laminate was manufactured in the same manner as in Example 1.

EXAMPLES 4 AND 5

A water-based adhesive material was manufactured by mixing an urethane resin emulsion (Toray Inc. BW-210) of 40 parts containing hydroxyl groups and carboxyl groups in 50% solid, an acrylic resin emulsion (Toray Inc. BW-210-1) of 60 parts as used in Examples 1-3, and sorbitolpolyglycidylether (Nagase Chemical Industry Co. Deconale Ex-614) of 10 parts. A thickener (Kao Co. Bissurf F) was added so as to yield an adhesive material of 8000 cps viscosity.

The adhesive material thus procured was applied to the principal surface of a polypropylene resin sheet foam having the apparent density shown in Table 1 at a spread rate of 50 g/m$^2$ using a doctor knife method. The adhesive material was dried, and was then baked using a 7 micron infrared heater.

A soft polyvinyl chloride resin sheet of 0.45 mm in thickness heated to 100° C. was laminated on the adhesive layer formed onto the foam and the sheet was pressed against it, whereby a molding laminate was manufactured.

COMPARATIVE EXAMPLE 2

In place of the water-based adhesive material, an adhesive material procured by mixing a conventional solvent-based urethane adhesive and an isocyanate curing agent was used, with which a laminate was manufactured in the same manner as in Example 1.

EXAMPLES 6-9/COMPARATIVE EXAMPLE 3-5

A water-based adhesive material was procured by mixing a urethane resin emulsion (Toray Inc. anionic BW-210) of 100 parts containing hydroxyl groups and carboxyl groups in 50% solid, and glycerolpolyglycidyl ether (Nagase Chemical Industry Co. Denacaol Ex-313) of 10 parts.

It then was applied to a polypropylene resin foam sheet having an apparent density of 0.056 g/cm$^3$ and a gel percent of 43%, at a spread rate of about 70 g/m$^2$, using the gravure roll method. The applied adhesive material was dried, and then was baked at the surface temperature shown in Table 2 by rays 0.75 to 20 microns in wavelength from an infrared heater.

Next, a polyvinyl chloride sheet of 0.45 mm in thickness was laminated on the baked adhesive layer, and under 100° C. heat was pressed against the resin foam, producing a molding laminate.

EXAMPLE 10

A water-based adhesive emulsion was procured by mixing an acrylic resin emulsion of 100 parts containing hydroxyl groups and carboxyl groups in 45% solid, and an aziridine compound of 4,4'-bis(ethyleniminocarbonylamino)diphenylmethane (Japan Syokubai Kagaku Kogyou Co. Chemitite DZ-22) of 10 parts. A thickener (Kao Co. Bissurf F) was added to the emulsion, so as to yield an adhesive material of 5000 cps viscosity.

The adhesive thus procured was applied at a spread rate of 50 g/m$^2$ to one principal surface of a polypropylene resin foam having an apparent density of 0.067 g/cm$^3$ by the gravure roll method. The adhesive material was then baked using an infrared heater. Next, a sheet of blended resin, comprising polyvinyl chloride resin and ABS resin of 0.7 mm in thickness, was laminated at a surface temperature of 80° C. on the foam adhesive layer and pressed against it to produce a molding laminate.

EXAMPLE 11

A laminate was manufactured in the same manner as in Example 10, except that a polypropylene resin foam having an apparent density of 0.050 g/cm$^3$ was used instead.

EXAMPLE 12

A water-based adhesive emulsion was manufactured by mixing an urethane resin emulsion of 60 parts containing hydroxyl groups and carboxyl groups in 50% solid, an acrylic resin emulsion of 60 parts as used in Example 12, and an aziridine compound of 10 parts as used in Example 10. A thickener was added to the emulsion, so as to yield on adhesive material of 8000 cps viscosity.

The water-based adhesive material thus procured was applied at a spread rate of 50 g/m$^2$ to the principal surface of a polypropylene resin foam having an apparent density of 0.050 g/cm$^3$ by the doctor knife method, and the adhesive layer formed was dried and was baked using an infrared heater.

Next, a polyvinyl chloride resin sheet 0.45 mm in thickness was laminated at a surface temperature of 80° C. on the foam adhesive layer, and pressed against it, to produce a molding laminate.

EXAMPLE 13

A laminate was manufactured in the same manner as in Example 10, except that the surface temperature during the infrared-ray baking process was 130° C. instead.

COMPARATIVE EXAMPLE 6

A molding laminate was manufactured in the same manner as in Example 10, except that the surface temperature during the infrared-ray baking process was 50° C. instead.

COMPARATIVE EXAMPLE 7

A molding laminate was manufactured in the same manner as in Example 10, except that a hot air-drying process was executed in place of the infrared-ray baking process.

COMPARATIVE EXAMPLE 8

A molding laminate was manufactured in the same manner as in Example 10, except that saturated polyester and isocyanate were used as the adhesive material and the curing agent respectively, and that the mixing ratio of the adhesive material and the curing agent was 100:10.

EVALUATION A

Various tests were carried out with respect to the laminates manufactured in Examples 1 to 13 and Comparative Examples 1 to 8. Following are detailed accounts of the tests. Tables 1 to 4 show the test results.

(1) Adhesive Strength Test

Specimens were prepared by cutting each of the laminates into small strips 25 mm in width. These specimens were subjected to 180° peel tests at room temperature (23° C.), as well as a high temperature (120° C.), using an autograph. The peeling speed was set to 500 mm/min. The criteria of the evaluation are indicated in the tables as follows.

With regard to Examples 1 to 9 and Comparative Examples 1 to 5
◯: Material disruption occured in the foam subjected to the peel tests.
×: The material on the inter-laminal surface peeled.

With regard to Examples 10 to 13 and Comparative Examples 6 to 8
◯: Disruption did not occur in the adhesive layer.
△: A partial disruption occurred in the adhesive layer.
×: Disruption occured in the adhesive layer.

A dash indicates that measurement of the peeling strength was not feasible.

(2) Molding Processability

Specimens equivalent to those used in the adhesive strength test were prepared, and were then heated at 160° to 180° C. The heated specimens were vacuum-molded using a female mold having a diameter (D) of 50 mm and a variable depth (H), and then the condition of the specimens thus molded was evaluated. The criteria of the evaluation are as indicated below.

With regard to Examples 1 to 9 and Comparative Examples 1 to 5
◯: The molded specimen was unbroken, and the facing material did not peel from the foam.
△: The foam was partially fractured.

With regard to Examples 10 to 13 and Comparative Examples 6 to 8

○: Disruption did not occur in the facing material nor the foam, and the adhesive layer did not peel.
Δ: The adhesive layer did not peel, but the neither portion of the foam was partially fractured.
X: The adhesive layer did not peel, but the foam was broken.

TABLE 1

| | APPARENT DENSITY OF FOAM (g/cm³) | ADHESIVE STRENGTH ROOM TEMPERATURE | ADHESIVE STRENGTH 120° C. | MOLDING PROCESSABILITY (H/D) 0.50 | 0.60 | 0.70 | 0.80 |
|---|---|---|---|---|---|---|---|
| EXAMPLE | | | | | | | |
| 1 | 0.068 | 3.67/○ | 1.29/○ | ○ | ○ | ○ | ○ |
| 2 | 0.052 | 3.10/○ | 1.10/○ | ○ | ○ | ○ | ○ |
| 3 | 0.042 | 2.95/○ | 0.99/○ | ○ | ○ | ○ | Δ |
| 4 | 0.068 | 3.48/○ | 1.24/○ | ○ | ○ | ○ | |
| 5 | 0.052 | 3.21/○ | 1.16/○ | ○ | ○ | ○ | |
| COMPARATIVE EXAMPLE | | | | | | | |
| 1 | 0.068 | 3.52/○ | 1.19/○ | ○ | ○ | ○ | Δ |
| 2 | 0.068 | 3.46/○ | 1.12/○ | ○ | ○ | ○ | Δ |

TABLE 2

| | BAKING TEMPERATURE (°C.) | ADHESIVE STRENGTH (kg/25 mm) | BROKEN STATE OF FOAM *1(%) |
|---|---|---|---|
| EXAMPLE | | | |
| 6 | 90 | 3.58 | 100 |
| 7 | 110 | 3.56 | 100 |
| 8 | 130 | 3.48 | 100 |
| 9 | 150 | 3.52 | 100 |
| COMPARATIVE EXAMPLE | | | |
| 3 | 40 | 1.34 | 0*2 |
| 4 | 60 | 2.05 | 100 |
| 5 | 180 | *3 | *3 |

*1 Proportion of the adherence area of foam remaining on surface of the facing material to the area peeled from the foam.
*2 Peeling along the interlaminar surface
*3 Foam and facing material did not adhere to each other; no measurement could be made.

TABLE 3

| | PEELED-OFF STATE OF ADHESIVE ROOM TEMPERATURE | 120° C. | VACUUM MOLDING PROCESSABILITY (D VALUE: mm) 50 | 60 | 70 |
|---|---|---|---|---|---|
| EXAMPLE 10 | ○ | ○ | ○ | ○ | ○ |
| EXAMPLE 11 | ○ | ○ | ○ | ○ | ○ |
| EXAMPLE 12 | ○ | ○ | ○ | ○ | ○ |

TABLE 4

| | PEELED-OFF STATE OF ADHESIVE ROOM TEMPERATURE | 120° C. | PEELING STRENGTH (kg/25 mm) ROOM TEMPERATURE | 120° C. | SOLVENT |
|---|---|---|---|---|---|
| EXAMPLE 10 | ○ | ○ | 3.59 | 1.19 | WATER |
| EXAMPLE 13 | ○ | ○ | 3.57 | 1.18 | WATER |
| COMPARATIVE EXAMPLE 6 | Δ | Δ | 3.56 | 1.19 | WATER |
| COMPARATIVE EXAMPLE 7 | X | X | — | — | WATER |
| COMPARATIVE EXAMPLE 8 | ○ | ○ | 3.58 | 1.17 | ORGANIC SOLVENT |

EXAMPLES 14 to 16

An acrylic resin emulsion (Toray Inc. BW-210-1) of 100 parts containing hydroxyl groups and carboxyl grous in 45% solid, and an epoxy curing agent (Toray Inc. BW-005) of 10 parts were mixed, and the viscosity of the mixture was adjusted to 8000 cps using a thickener, whereby an adhesive emulsion was procured. This adhesive emulsion was applied at a spread rate of 50 g/m² to the principal surface of each of three polypropylene resin foam sheets having respective gel percents of 34%, 53% and 70%, and an apparent density of 0.067 g/cm³, by the gravure roll method.

The applied adhesive material was dried, and was baked using an infrared heater wherein the average wavelength of the irradiating rays ranged from 2 to 15 μm, whereby an adhesive layer was formed onto each foam. A polyvinyl chloride resin sheet 0.5 mm in thickness, with a 100%-elongation stress of 100 kg/cm² at 25° C. was pressed on the adhesive layer at a surface temperature of 80° C., whereby a stamp-molding laminate was produced.

Three types of molds were employed, having boxlike upper and lower molding portions of 35 cm square in horizontal section the lateral sides of which were at right angles, beveled at 60°, and beveled at 45°, respectively, in order to manufacture stamp-molded articles from the laminates. A rigid material resin containing 80 wt. percent polypropylene resin and 20 wt. percent thickener was set into the lower mold-half of each mold, each of which was closed under a pressure of 50 tons.

EXAMPLE 17

A stamp-molding laminate was manufactured in the same manner as in Example 15, except that a soft polyvinyl chloride resin sheet having a 100%-elongation stress of 145 kg/cm² at 25° C. was used as the facing material. A stamp-molded product was manufactured using the laminate in the same manner as in Example 15.

COMPARATIVE EXAMPLE 9

A stamp-molding laminate was manufactured in the same manner as in Example 15, except that a soft polyvinyl chloride resin sheet having a 100%-elongation stress of 159 kg/cm$^2$ at 25° C. was used as the facing material. A stamp-molded product was manufactured using the laminate in the same manner as in Example 15.

COMPARATIVE EXAMPLE 10

A stamp-molding laminate was manufactured in the same manner as in Example 15, except that a soft polyvinyl chloride resin sheet having a 100%-elongation stress of 170 kg/cm$^2$ at 25° C. was used as the facing material. A stamp-molded product was manufactured using the laminate in the same manner as in Example 15.

COMPARATIVE EXAMPLE 11

A polypropylene resin foam having a gel percent of 27% and an apparent density of 0.067 g/cm$^3$, and a blended-resin sheet having a 100%-elongation stress of 180 kg/cm$^2$ at 25° C. comprising polyvinyl chloride resin and ABS resin (acrylonitrile-butadiene-styrene resin) were used, to produce a stamp-molding laminate in the same manner as in Examples 14 to 16. A stamp-molded product was manufactured using the laminate, likewise as in Examples 14 to 16.

COMPARATIVE EXAMPLES 12, 13

A stamp-molding laminate was manufactured according to the manner of Examples 14 to 16, except that polypropylene foam sheets having a gel percent of 27% and 77% and an apparent density of 0.067 g/cm$^3$ were used. A stamp-molded product was manufactured using the laminate likewise as in Examples 14 to 16.

While no milkiness was observed in the corner portions of the stamp-molded article using the 27%-gel percent foam, there was unevenness in the surface of its facing material. It was thus not a viable product. In the case of the stamp-molded product using the 77%-gel percent foam, breaks occurred in the 90°-corner portions of the foam, and in the 60°- and 45°-corner portions, the extent of the expansion of the foam was limited such that sharp corners conforming to the angles were not formed.

EXAMPLE 18

A urethane resin emulsion (Toray Inc. BW-210) of 40 parts containing hydroxyl groups and carboxyl groups in 55% solid, an acrylic resin emulsion (Toray Inc. BW-201-1) of 60 parts, and an epoxy curing agent (Toray Inc. BW-001) of 10 parts were mixed produce an adhesive emulsion. The adhesive emulsion was applied at the spread rate of 60 g/m$^2$ to the principal surface of a polypropylene resin foam sheet having a gel percent of 54% and an apparent density of 0.050 g/cm$^3$, using the doctor knife method.

The applied adhesive material was dried, and was baked using an infrared heater wherein the wavelength of the irradiating rays ranged from 1 to 15 μm. A soft sheet comprising a mixture of polyvinyl chloride resin and ABS resin, 0.4 mm in thickness and having a 100%-elongation stress of 142 kg/cm$^2$ at 25° C. was used as a facing material. After its surface temperature was brought to 80° C., it was put on the adhesive layer and was pressed against it, producing a stamp-molding laminate.

A stamp-molded product was manufactured using the obtained laminate in the same manner as in Examples 14 to 16.

COMPARATIVE EXAMPLE 14

A stamp-molding laminate was manufactured in the same manner as in Example 18, except that a mixture of a conventional solvent-based polyester adhesive and isocyanate in a proportion of 100:1 was used. A stamp-molded product was manufactured using the laminate likewise as in Example 16.

EXAMPLE 19

An acrylic resin emulsion of 100 parts containing hydroxyl groups and carboxyl groups in 45% solid, and an aziridine compound of 4,4'-bis(ethyleniminocarbonylamino)diphenylmethane (Nihon Shokubai Kagaku Kogyou Co. Chemitite DZ-22) of 10 were mixed, and a thickener was added to the mixture to adjust the viscosity to 8000 cps, whereby an emulsion-type water-based adhesive material was manufactured. This water-based adhesive material was applied at the spread rate of 50 g/m$^2$ to the principal surface of a polypropylene resin foam having a gel percent of 53% and an apparent density of 0.067 g/cm$^3$ by the gravure roll method.

Then, the applied adhesive material was dried, and was baked using an infrared heater. A polyvinyl chloride resin sheet 0.5 mm in thickness at a surface temperature of 80° C. having a 100%-elongation stress of 100 kg/cm$^2$ at 25° C. was laminated on the adhesive layer and pressed against it, producing a stamp-molding laminate.

Three types of molds were employed, of identical design to those employed in Examples 14 to 16, in order to manufacture stamp-molded articles from the laminates. A rigid material resin containing 80 wt. percent polypropylene resin and 20 wt. percent thickener was set into the lower mold-half of each mold, each of which was closed under a pressure of 50 tons.

EXAMPLE 20

A stamp-molded article was manufactured in the manner according to Example 19, except that a soft polyvinyl chloride resin sheet having a 100%-elongation stress of 145 kg/cm$^2$ at 25° C. was used.

COMPARATIVE EXAMPLE 15

A stamp-molded article was manufactured in the same manner as in Example 19, except that a soft polyvinyl chloride resin sheet with a 100%-elongation stress of 159 kg/cm$^2$ at 25° C. was used.

COMPARATIVE EXAMPLE 16

A stamp-molded article was manufactured likewise as in Example 19, except that a soft polyvinyl chloride resin sheet with a 100%-elongation stress of 170 kg/cm$^2$ at 25° C. was used.

EXAMPLE 21

A water-based adhesive material was procured by mixing a urethane resin emulsion of 40 parts containing hydroxyl groups and carboxyl groups in 55% a solid, an acrylic resin emulsion of 60 parts, and an aziridine compound of 10 parts, (as used in Example 19) and the viscosity of the mixture was adjusted to 10,000 cps by the addition of a thickener. The water-based adhesive material was applied at a spread rate of 60 g/m² to the principal surface of a polypropylene resin foam having a gel percent of 54% and an apparent density of 0.050 g/cm³ using the doctor knife method.

The adhesive material thus applied was dried, and was baked using an infrared heater, to form an adhesive layer. A soft sheet consisting of a mixture of polyvinyl chloride resin and ABS resin 0.4 mm in thickness and having a 100%-elongation stress of 142 kg/cm² at 25° C., the surface of which was heated to 80° C., was laminated on the adhesive layer and was pressed against it to produce a stamp-molded laminate.

Using the same three types of molds employed in Example 19, stamp-molded articles were manufactured from the laminates under the same conditions as in Example 19.

COMPARATIVE EXAMPLE 17

An adhesive material was prepared by mixing isocyanate with a saturated polyester adhesive agent in the ratio of 100:10. This adhesive material was applied at a spread rate of 60 g/m² to the principal surface of a polypropylene resin foam of 54% gel percent and apparent density of 0.050 g/cm³, using the doctor knife method.

The applied adhesive material was dried, and was baked using an infrared heater, thus forming an adhesive layer. A soft sheet consisting of a mixture of polyvinyl chloride resin and ABS resin 0.4 mm in thickness having a 100%-elongation stress of 142 kg/cm² at 25° C. was laminated at a surface temperature of 80° C. on the adhesive layer and pressed against it, producing a stamp-molding laminate.

Then, by using the same three types of molds employed in Example 19, stamp-molded articles were manufactured from the laminates under the same conditions as in Example 19.

EVALUATION B

The stamp-molded articles produced in Examples 14 to 21 and Comparative Examples 9 to 17 were subjected to various relevant tests, as described below in detail. Tables 5 to 8 show the results of the tests.

(1) Disruption of Pad Material (Resin Foam) and Interlaminal Peeling

Disruption of the pad, and inter-laminal peeling of the facing material from the pad material were examined.

The criteria of the evaluation were as follows.

○: No disruption nor inter-laminal peeling

Δ: No practical degradation, although the disruption ratio of the pad material was 70% or more.

×: Disruption and/or inter-laminal peeling occurred.

(2) Wrinkles at Corners

The presence or absence of wrinkles at corners of the article was examined.

The criteria of the evaluation were as follows.

○: No wrinkles.
Δ: Some wrinkles.
×: Many wrinkles.

(3) Milkiness at Corners

The corners of the articles were examined for milkiness in each of the cases in which the boxlike molds having lateral-side angles of 90°, 60° and 45° were used. The criteria of the evaluation were as follows.

○: No milkiness.
Δ: Some milkiness.
×: Conspicuous milkiness.

(4) Elongation Ratio of Adhesive Layer

A stamp-molding laminate according to the present invention was manufactured, and was cut into small strips 30 mm in width, and a uni-directional stress was applied to each strip using an autograph, whereby they were subjected to elongation. The point at which disruption occurred in the adhesive layer was regarded as the limit point of elongation of the adhesive layer, and thus the elongation percentage of the adhesive layer was recorded at that point. Since it is not necessary to take into account temperature adaptability for the stamp-molding method, the measurement was made at room temperature (25° C.).

(5) Adhesive Layer Conditions at Corners of Molded Article:

The condition of the adhesive layer at the corners of the molded article was examined in each of the cases in which the boxlike molds having lateral side angles of 90°, 60°, and 45° was used. The criteria of the evaluation were as follows.

○: The adhesive layer did not peel.
Δ: The adhesive layer peeled partially.
×: The adhesive layer peeled.

(6) Adhesive Strength

Specimens were prepared by cutting a stamp-molding laminate into small strips 25 mm in width. 180° peel tests were carried out on these specimens at room temperature (23° C.) and at high temperature (120° C.) using an autograph, and the adhesive strength and adhesive property of each specimen were evaluated.

The criteria of the evaluation were as follows.

○: The adhesive layer did not peel.
×: The adhesive layer peeled.

TABLE 5

| | GEL PERCENT (%) | DISRUPTION OF PAD MATERIAL AND INTERLAMINAL PEELING | WRINKLES AT CORNERS | MILKINESS AT CORNERS | | |
|---|---|---|---|---|---|---|
| | | | | 90° | 60° | 45° |
| EXAMPLE | | | | | | |
| 14 | 34 | ○ | ○ | ○ | ○ | ○ |
| 15 | 53 | ○ | ○ | ○ | ○ | ○ |
| 16 | 70 | Δ | ○ | ○ | ○ | ○ |
| 17 | 53 | ○ | ○ | ○ | ○ | ○ |
| COMPARATIVE EXAMPLE | | | | | | |
| 9 | 53 | ○ | Δ | × | ○ | ○ |
| 10 | 53 | ○ | × | × | × | ○ |

TABLE 5-continued

| | GEL PERCENT (%) | DISRUPTION OF PAD MATERIAL AND INTERLAMINAL PEELING | WRINKLES AT CORNERS | MILKINESS AT CORNERS | | |
|---|---|---|---|---|---|---|
| | | | | 90° | 60° | 45° |
| 11 | 27 | ○ | * | X | X | X |

*90°: X
60°: Δ
45°: Δ

TABLE 6

| | ELONGATION OF ADHESIVE LAYER (%) | CONDITION OF ADHESIVE LAYER AT CORNERS | | | ADHESIVE STRENGTH | PEELING STRENGTH (kg/cm²) |
|---|---|---|---|---|---|---|
| | | 90° | 60° | 45° | | |
| EXAMPLE 18 | 165 | ○ | ○ | ○ | ○ | 3.57 |
| COMPARATIVE EXAMPLE 14 | 78 | X | Δ | ○ | ○ | 3.51 |

TABLE 7

| | DISRUPTION OF PAD MATERIAL AND INTERLAMINAL PEELING | WRINKLES AT CORNERS | MILKINESS AT CORNERS | | |
|---|---|---|---|---|---|
| | | | 90° | 60° | 45° |
| EXAMPLE 19 | ○ | ○ | ○ | ○ | ○ |
| EXAMPLE 20 | ○ | ○ | ○ | ○ | ○ |
| COMPARATIVE EXAMPLE 15 | ○ | Δ | X | ○ | ○ |

TABLE 8

| | ADHESIVE MATERIAL | ELONGATION OF ADHESIVE LAYER (%) | CONDITIONS OF ADHESIVE LAYER AT CORNERS | | | ADHESIVE STRENGTH | PEELING STRENGTH (kg/cm²) |
|---|---|---|---|---|---|---|---|
| | | | 90° | 60° | 45° | | |
| EXAMPLE 21 | WATER-BASED | 165 | ○ | ○ | ○ | ○ | 3.57 |
| COMPARATIVE EXAMPLE 16 | ORGANIC SOLVENT | 78 | X | Δ | ○ | ○ | 3.51 |

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A molding laminate comprising
   a cross-linked polyolefin resin foam;
   a facing material laminated on said cross-linked polyolefin resin foam; and
   an adhesive layer adhering said facing material to said cross-linked polyolefin resin foam, said adhesive layer comprising a water-based adhesive material which is an emulsion selected from the group consisting of acrylic resins having polar groups and urethane resins having polar groups, and a curing agent, comprising an aziridine, which has been applied to at least one of said foam and said facing, and baked thereon by means of an infrared radiation in advance of adhering said cross-linked polyolefin resin foam and said facing material to each other.

2. A laminate according to claim 1, wherein the mixing ratio of said water-based adhesive material to said curing agent in said adhesive layer is in the range of 100:1 to 100:20.

3. A laminate according to claim 2, wherein said cross-linked polyolefin resin foam has a gel content ranging from 5% to 75%.

4. A laminate according to claim 3, wherein said cross-linked polyolefin resin foam has an apparent density ranging from 0.5 to 0.050 g/cm³.

5. A laminate according to claim 4, wherein said cross-linked polyolefin resin foam is from 1.0 to 10.0 mm in thickness.

6. A laminate according to claim 5, wherein said cross-linked polyolefin resin foam is a polyethylene resin foam.

7. A laminate according to claim 6, wherein said polyethylene resin is an ethylene homopolymer.

8. A laminate according to claim 7, wherein said homopolymer has a density ranging from 0.897 to 0.955 g/cm³, and a melt index ranging from 0.5 to 55.

9. A laminate according to claim 6, wherein said polyethylene resin is a propylene copolymer resin.

10. A laminate according to claim 5, wherein said cross-linked polyolefin resin foam is a polypropylene resin foam.

11. A laminate according to claim 10, wherein said polypropylene resin is a propylene homopolymer resin.

12. A laminate according to claim 10, wherein said polypropylene resin is a propylene copolymer resin.

13. A laminate according to claim 12, wherein said propylene copolymer resin comprising a copolymer of 0.5 to 35 mole percent of at least one of ethylene and butene with propylene.

14. A laminate according to claim 5, wherein the cross-linking of said cross-linked polyolefin resin foam is effected by irradiation.

15. A laminate according to claim 5, wherein the cross-linking of said cross-linked polyolefin resin foam is effected chemically by using peroxide.

16. A laminate according to claim 5, wherein the cross-linking of said cross-linked polyolefin resin foam is effected by ultraviolet irradiation.

17. A laminate according to claim 5, wherein said facing material is from 0.2 to 2.0 mm in thickness.

18. A laminate according to claim 1, wherein said aziridine curing agent is a compound having at least two aziridine rings.

19. A laminate according to claim 17, wherein said water-based adhesive material is a water-based urethane resin.

20. A laminate according to claim 17, wherein said adhesive layer is not broken in 180° peeling strength tests at room temperature and at 120° C.

21. A laminate according to claim 17, wherein said cross-linked polyolefin resin foam is provided with another adhesive layer comprising a water-based adhesive material containing a curing agent.

22. A stamp-molded product comprising:
a cross-linked polyolefin resin foam;
a rigid layer thermally fused to said cross-linked polyolefin resin foam;
a facing material laminated on said cross-linked resin foam; and
an adhesive layer comprising a water-based adhesive material and a curing agent, comprising an aziridine for adhering said facing material to said cross-linked polyolefin resin foam, said adhesive layer baked in advance of the inter-laminal adhesion process onto said cross-linked polyolefin resin foam and/or said facing material.

23. A stamp-molded product according to claim 22, wherein said rigid layer comprises a thermoplastic resin.

24. A stamp-molded product according to claim 23, wherein said thermoplastic resin is a homopolymer selected from the group consisting of polyethylene resin, polypropylene resin and polybutene resin.

25. A stamp-molded product according to claim 23, wherein said thermoplastic resin is a copolymer comprising two or more substances selected from the group consisting of ethylene, propylene, and butene.

26. A stamp-molded product according to claim 23, wherein a mixing ratio of said water-based adhesive material to said curing agent in said adhesive layer is in the range of 100:1 to 100:20.

27. A stamp-molded product according to claim 26, wherein said cross-linked polyolefin resin foam has a gel percent ranging from 40% to 65%.

28. A stamp-molded product according to claim 27, wherein said cross-linked polyolefin resin foam has an apparent density ranging from 0.100 to 0.040 g/cm$^3$.

29. A stamp-molded product according to claim 28, wherein said cross-linked polyolefin resin foam is 1.0 to 10.0 mm in thickness.

30. A stamp-molded product according to claim 29, wherein said cross-linked polyolefin resin foam is a polyethylene resin foam.

31. A stamp-molded product according to claim 30, wherein said polyethylene resin is an ethylene homopolymer.

32. A stamp-molded product according to claim 31, wherein said ethylene homopolymer is of density ranging from 0.897 to 0.955 g/cm$^3$ and melt index ranging from 0.5 to 55.

33. A stamp-molded product according to claim 30, wherein said polyethylene resin is a polyethylene copolymer resin.

34. A stamp-molded product according to claim 29, wherein said cross-linked polyolefin resin foam is a polypropylene resin foam.

35. A stamp-molded product according to claim 34, wherein said polypropylene resin is a propylene homopolymer.

36. A stamp-molded product according to claim 34, wherein said polypropylene resin is a polypropylene copolymer resin.

37. A stamp-molded product according to claim 36, wherein said polypropylene copolymer resin is procured by copolymerization of ethylene or butene in 0.5 to 25 mole percent with propylene.

38. A stamp-molded product according to claim 29, wherein the cross-linking of said cross-linked polyolefin resin foam is effected by irradiation.

39. A stamp-molded product according to claim 29, wherein the cross-linking of said cross-linked polyolefin resin foam is effected by chemically using peroxide.

40. A stamp-molded product according to claim 29, wherein the cross-linking of said cross-linked polyolefin resin foam is effected by ultraviolet irradiation.

41. A stamp-molded product according to claim 29, wherein the 100%-elongation stress of said facing material ranges from 150 to 25 kg/cm$^2$ at 25° C.

42. A stamp-molded product according to claim 41, wherein said facing material is 0.2 to 2.0 mm in thickness.

43. A stamp-molded product according to claim 22, wherein said aziridine curing agent is a compound having two or more aziridine rings.

44. A stamp-molded product according to claim 22, wherein said adhesive layer is not broken in 180° peeling strength tests at room temperature and at 120° C.

* * * * *